US009503466B2

(12) United States Patent
Vasseur et al.

(10) Patent No.: US 9,503,466 B2
(45) Date of Patent: Nov. 22, 2016

(54) CROSS-VALIDATION OF A LEARNING MACHINE MODEL ACROSS NETWORK DEVICES

(71) Applicant: Cisco Technology, Inc., San Jose, CA (US)

(72) Inventors: Jean-Philippe Vasseur, Saint Martin d'Uriage (FR); Javier Cruz Mota, Assens (CH); Andrea Di Pietro, Lausanne (CH)

(73) Assignee: Cisco Technology, Inc., San Jose, CA (US)

( * ) Notice: Subject to any disclaimer, the term of this patent is extended or adjusted under 35 U.S.C. 154(b) by 290 days.

(21) Appl. No.: 14/164,482

(22) Filed: Jan. 27, 2014

(65) Prior Publication Data
US 2015/0193697 A1  Jul. 9, 2015

Related U.S. Application Data

(60) Provisional application No. 61/923,847, filed on Jan. 6, 2014.

(51) Int. Cl.
*G06N 3/08* (2006.01)
*H04L 29/06* (2006.01)
(Continued)

(52) U.S. Cl.
CPC ............ *H04L 63/1425* (2013.01); *G06N 3/02* (2013.01); *G06N 99/005* (2013.01); *H04L 41/16* (2013.01); *H04L 43/0876* (2013.01); *H04L 47/127* (2013.01); *H04L 47/2466* (2013.01); *H04L 47/41* (2013.01); *G06N 3/08* (2013.01); *G06N 3/084* (2013.01); *H04L 45/48* (2013.01)

(58) Field of Classification Search
None
See application file for complete search history.

(56) References Cited

U.S. PATENT DOCUMENTS 7,526,806 B2   4/2009   Wiley et al.
7,603,709 B2   10/2009   Lewis et al.
(Continued)

FOREIGN PATENT DOCUMENTS

EP   2442525 A1   4/2012
WO   WO-02/48959 A2   6/2002

OTHER PUBLICATIONS

Chong, Developing a Data Communication Model for Distributed Artificial Neural Network (DANN) Remote Training Environments, Masters Thesis, Indiana State University, 2004, pp. 1-73.*
(Continued)

*Primary Examiner* — Wilbert L Starks
(74) *Attorney, Agent, or Firm* — Parker Ibrahim & Berg LLC; James M. Behmke; Stephen D. LeBarron

(57) ABSTRACT

In one embodiment, a first network device receives a notification that the first network device has been selected to validate a machine learning model for a second network device. The first network device receives model parameters for the machine learning model that were generated by the second network device using training data on the second network device. The model parameters are used with local data on the first network device to determine performance metrics for the model parameters. The performance metrics are then provided to the second network device.

23 Claims, 16 Drawing Sheets

(51) Int. Cl.
*G06N 99/00* (2010.01)
*H04L 12/26* (2006.01)
*G06N 3/02* (2006.01)
*H04L 12/24* (2006.01)
*H04L 12/801* (2013.01)
*H04L 12/855* (2013.01)
*H04L 12/891* (2013.01)
*H04L 12/753* (2013.01)

(56) References Cited

U.S. PATENT DOCUMENTS

| | | |
|---|---|---|
| 7,657,940 B2 | 2/2010 | Portolani et al. |
| 7,675,926 B2 | 3/2010 | Olsen et al. |
| 7,694,335 B1 | 4/2010 | Turner et al. |
| 7,733,798 B2 | 6/2010 | White et al. |
| 7,779,471 B2 | 8/2010 | Balasubramaniyan et al. |
| 7,793,138 B2 | 9/2010 | Rastogi et al. |
| 7,854,000 B2 | 12/2010 | Venkat et al. |
| 7,971,256 B2 | 6/2011 | Bhikkaji et al. |
| 8,032,779 B2 | 10/2011 | Clemm et al. |
| 8,121,024 B1 | 2/2012 | Natarajan et al. |
| 8,161,554 B2 | 4/2012 | Sadhasivam et al. |
| 8,230,498 B2 | 7/2012 | Shaffer et al. |
| 8,261,355 B2 | 9/2012 | Rayes et al. |
| 8,312,541 B2 | 11/2012 | Levy-Abegnoli et al. |
| 8,619,576 B2 | 12/2013 | Vasseur et al. |
| 8,634,316 B2 | 1/2014 | Rosenberg et al. |
| 2008/0083029 A1 | 4/2008 | Yeh et al. |
| 2008/0148342 A1 | 6/2008 | Aiyagari et al. |
| 2011/0258702 A1 | 10/2011 | Olney et al. |
| 2012/0023572 A1 | 1/2012 | Williams, Jr. et al. |
| 2012/0026938 A1 | 2/2012 | Pandey et al. |
| 2012/0155475 A1 | 6/2012 | Vasseur et al. |
| 2012/0230204 A1 | 9/2012 | Vasseur et al. |
| 2012/0320923 A1 | 12/2012 | Vasseur et al. |
| 2013/0010610 A1 | 1/2013 | Karthikeyan et al. |
| 2013/0024560 A1 | 1/2013 | Vasseur et al. |
| 2013/0159479 A1 | 6/2013 | Vasseur |
| 2013/0159548 A1 | 6/2013 | Vasseur et al. |
| 2013/0179538 A1 | 7/2013 | Dutta et al. |
| 2013/0219046 A1 | 8/2013 | Wetterwald et al. |
| 2013/0276114 A1 | 10/2013 | Friedrichs et al. |
| 2013/0298184 A1 | 11/2013 | Ermagan et al. |
| 2014/0022906 A1 | 1/2014 | Vasseur et al. |
| 2014/0025945 A1 | 1/2014 | McGrew et al. |

OTHER PUBLICATIONS

Cai, et al., "Distributed Aggregation Algorithms with Load-Balancing for Scalable Grid Resource Monitoring", Parallel and Distributed Processing Symposium, Mar. 2007, 10 pages, Institute of Electical and Electronics Engineers.

Hwang, et al., "DHT-Based Security Infrastructure for Trusted Internet and Grid Computing", International Journal of Critical Infrastructures, vol. 2, No. 4, Nov. 2009, pp. 412-433, Inderscience Publishers.

Jover, R.P., "Security Attacks Against the Availability of LTE Mobility Networks: Overview and Research Directions", 16th International Symposium on Wireless Personal Multimedia Communications (WPMC), Jun. 2013, 9 pages, Atlantic City, NJ.

Lippmann, et al., "Analysis and Results of the 1999 DARPA Off-Line Intrusion Detection Evaluation", Proceedings of the Third International Workshop on Recent Advances in Intrusion Detection, RAID, (2000), pp. 162-182, Springer-Verlag, London, UK.

Oh, et al., "Distributed Learning in Mobile Sensor Networks Using Cross Validation" 49th IEEE Conference on Decision and Control, Dec. 2010, 6 pages, Institute of Electrical and Electronics Engineers, Atlanta, GA.

Ryan, et al., "Intrusion Detection with Neural Networks", Technical Report WS-97-07, (1997), pp. 72-77, Association for the Advancement of Artificial Intelligence.

Sommer, R., "Outside the Closed World: On Using Machine Learning for Network Intrusion Detection", IEEE Symposium on Security and Privacy, May 2010, pp. 305-316, Intitute of Electrical and Electronics Engineers, Oakland, CA.

Vasseur et al., "Computer Network Anomaly Training and Detection Using Artificial Neural Networks", U.S. Appl. No. 61/923,847, filed Jan. 6, 2014, 166 pgs., U.S. Patent and Trademark Office, Alexandria, Virginia.

Vasseur, et al., "Routing Metrics Used for Path Calculation in Low-Power and Lossy Networks", Request for Comments 6551, Mar. 2012, 30 pages, Internet Engineering Task Force Trust.

Viola, et al. "Rapid Object Detection Using a Boosted Cascade of Simple Features", Proceedings of the 2001 IEEE Computer Vision and Pattern Recognition, vol. 1, (2001), 8 pages, Institute of Electical and Electronics Engineers.

Winter, et al., "RPL: IPv6 Routing Protocol for Low-Power and Lossy Networks", Request for Comments 6550, Mar. 2012, 157 pages, Internet Engineering Task Force Trust.

Zinkevic, et al., "Parallelized Stochastic Gradient Descent", Proceedings of the Advances in Neural Information Processing Systems 23 (2010), 37 pages.

\* cited by examiner

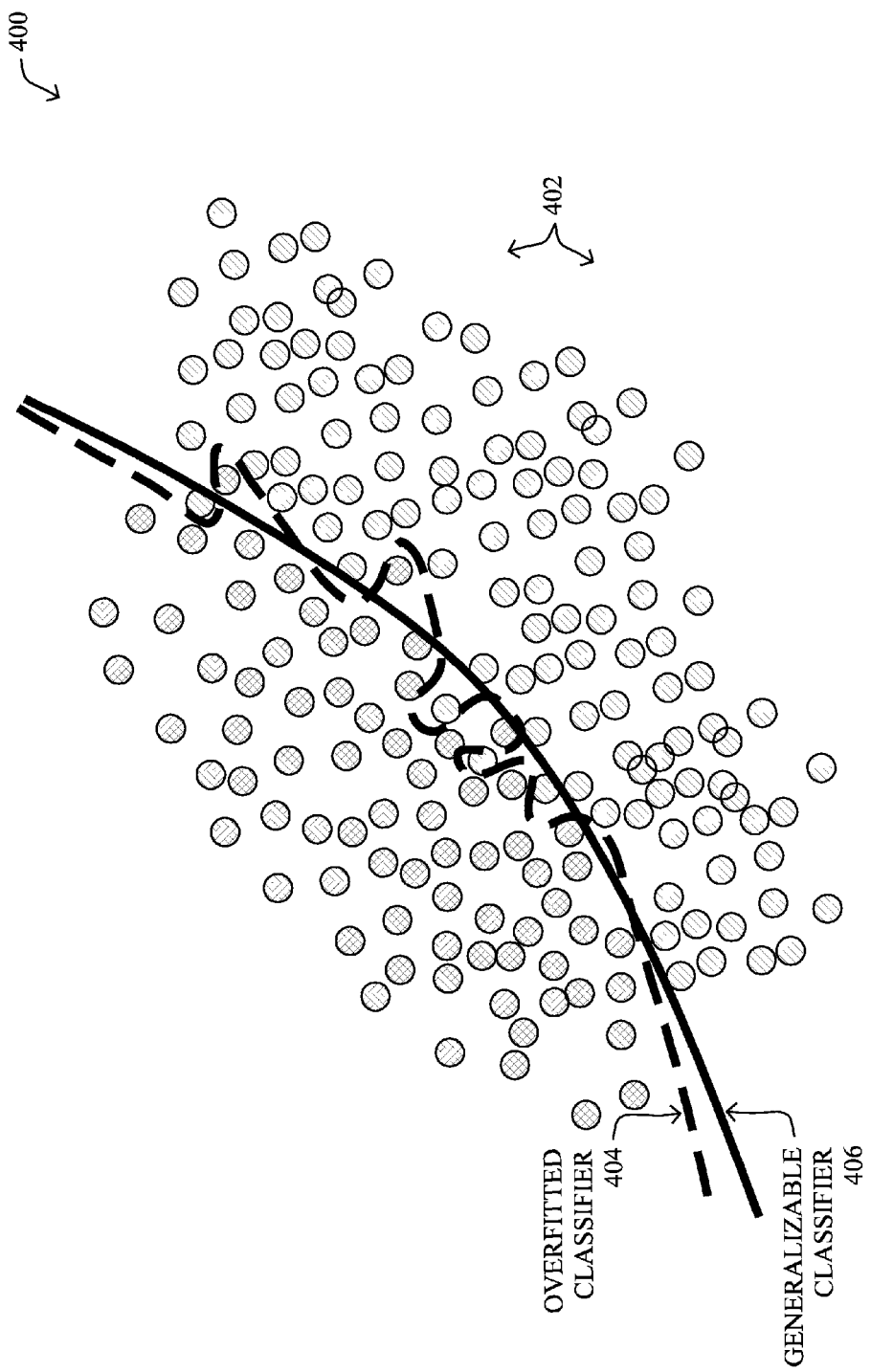

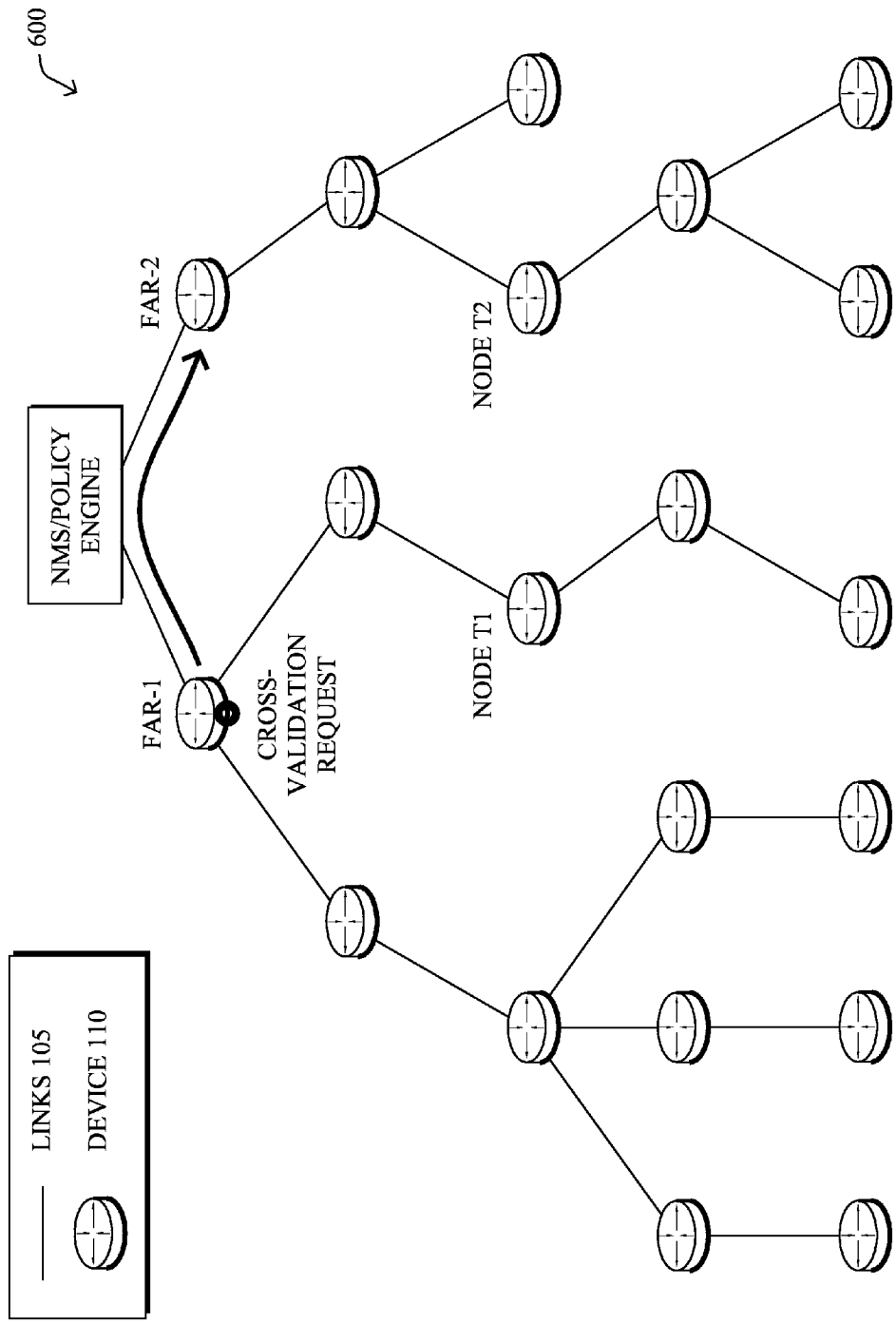

CROSS-VALIDATION OF A LEARNING MACHINE MODEL ACROSS NETWORK DEVICES

RELATED APPLICATIONS

This application claims priority to U.S. Provisional Application No. 61/923,847, filed Jan. 6, 2014, entitled: COMPUTER NETWORK ANOMALY TRAINING AND DETECTION USING ARTIFICIAL NEURAL NETWORKS, by Vasseur, et al., the contents of which are herein incorporated by reference.

TECHNICAL FIELD

The present disclosure relates generally to computer networks, and, more particularly, to the use of learning machines within computer networks.

BACKGROUND

Low power and Lossy Networks (LLNs), e.g., Internet of Things (IoT) networks, have a myriad of applications, such as sensor networks, Smart Grids, and Smart Cities. Various challenges are presented with LLNs, such as lossy links, low bandwidth, low quality transceivers, battery operation, low memory and/or processing capability, etc. The challenging nature of these networks is exacerbated by the large number of nodes (an order of magnitude larger than a "classic" IP network), thus making the routing, Quality of Service (QoS), security, network management, and traffic engineering extremely challenging, to mention a few.

Machine learning (ML) is concerned with the design and the development of algorithms that take as input empirical data (such as network statistics and performance indicators), and recognize complex patterns in these data. In general, these patterns are then used to make decisions automatically (i.e., close-loop control) or to help make decisions. ML is a very broad discipline used to tackle very different problems (e.g., computer vision, robotics, data mining, search engines, etc.), but the most common tasks are the following: linear and non-linear regression, classification, clustering, dimensionality reduction, anomaly detection, optimization, and association rule learning.

One very common pattern among ML algorithms is the use of an underlying model M, whose parameters are optimized for minimizing the cost function associated to M, given the input data. For instance, in the context of classification, the model M may be a straight line that separates the data into two classes such that $M=a*x+b*y+c$ and the cost function would be the number of misclassified points. The ML algorithm then consists in adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Learning Machines (LMs) are computational entities that rely on one or more ML techniques for performing a task for which they have not been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficiently management by a network operator.

Thus far, LMs have not generally been used in LLNs, despite the overall level of complexity of LLNs, where "classic" approaches (based on known algorithms) are inefficient or when the amount of data cannot be processed by a human to predict network behavior considering the number of parameters to be taken into account.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 4 illustrates an example of an overfitted classification model;

FIGS. 6A-6C illustrate an example of a network device/node requesting cross-validation of a machine learning model via a multicast request;

DESCRIPTION OF EXAMPLE EMBODIMENTS

Overview

Figure 1:
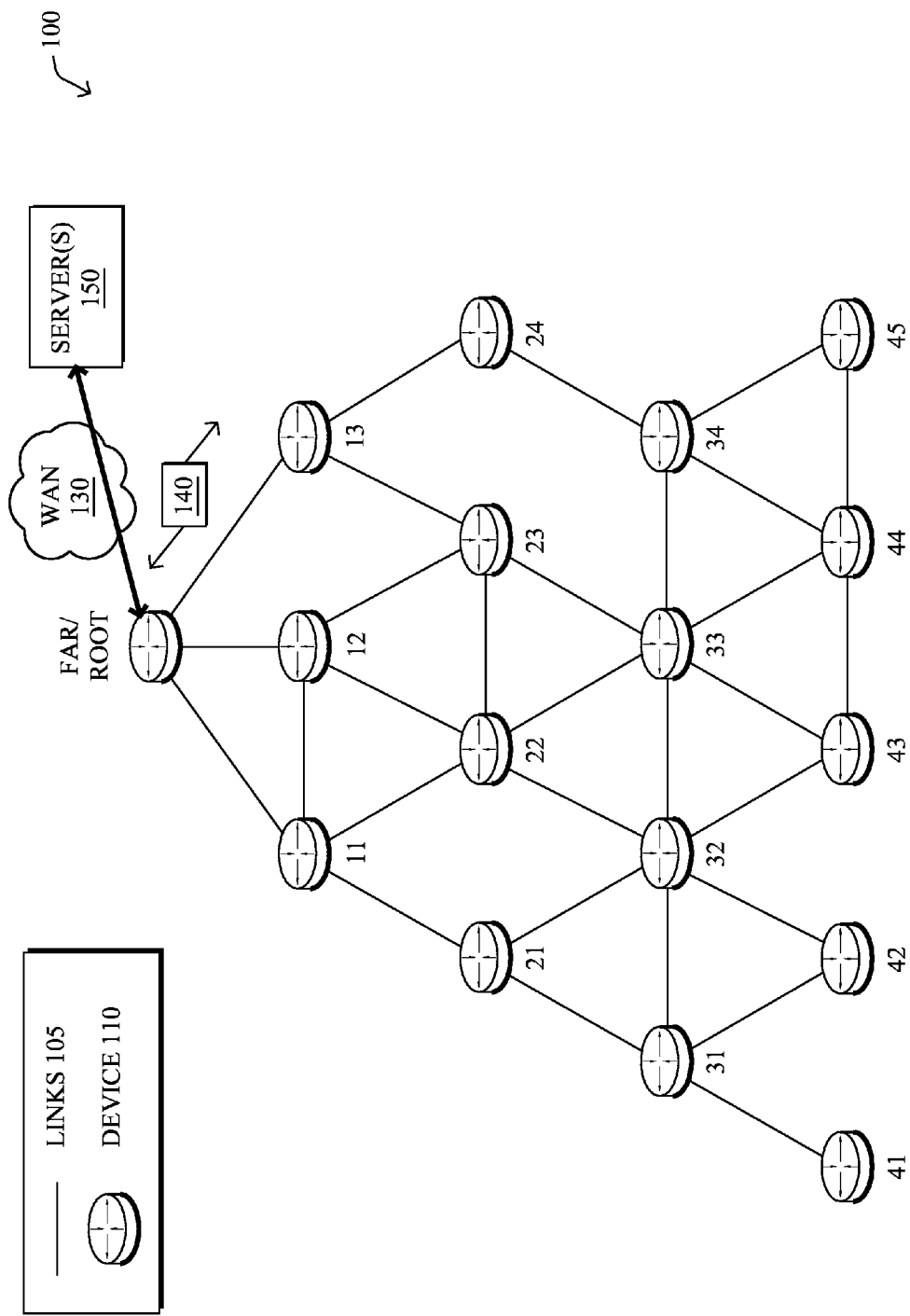
FIG. 1 illustrates an example communication network.

According to one or more embodiments of the disclosure, a first network device receives a notification that the first network device has been selected to validate a machine learning model for a second network device. The first network device receives model parameters for the machine learning model that were generated by the second network device using training data on the second network device. The model parameters are used with local data on the first network device to determine performance metrics for the model parameters. The performance metrics are then provided to the second network device.

In one or more embodiments, a validation request is sent by a first network device to one or more network devices to validate a machine learning model. A notification is received by the first network device that a particular network device of the one or more network devices has been selected to perform the validation. The first network device sends machine learning model parameters to the particular network device to cause the particular network device to generate performance metrics using the model parameters with a local data set. The performance metrics are then received and a determination is made as to whether the model parameters are valid based on a comparison between the received performance metrics and performance metrics generated by the first network device.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications), temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 110 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 110, such as, e.g., routers, sensors, computers, etc., may be in communication with other nodes 110, e.g., based on distance, signal strength, current operational status, location, etc. The illustrative root node, such as a field area router (FAR) of a FAN, may interconnect the local network with a WAN 130, which may house one or more other relevant devices such as management devices or servers 150, e.g., a network management server (NMS), a dynamic host configuration protocol (DHCP) server, a constrained application protocol (CoAP) server, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
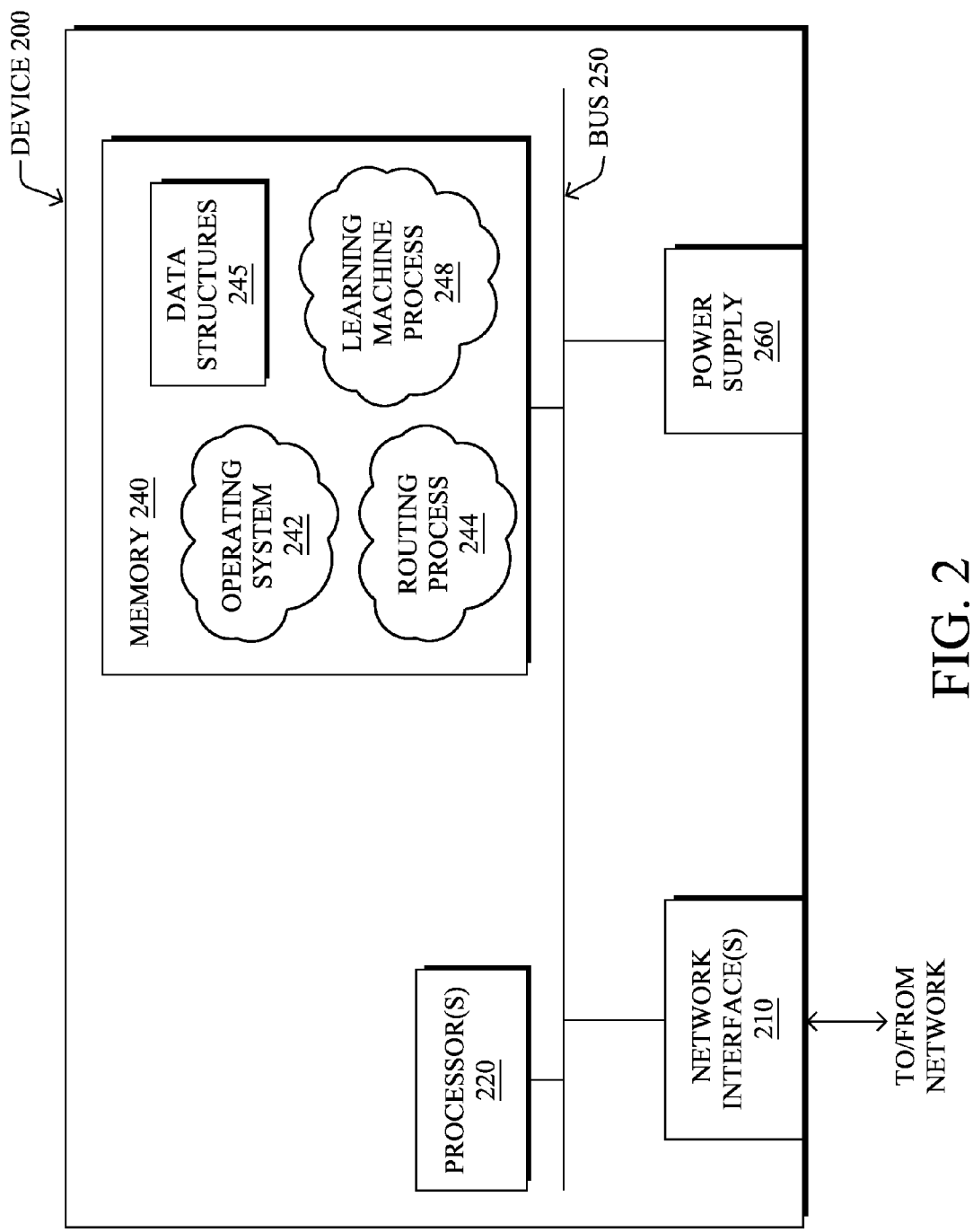
FIG. 2 illustrates an example network device/node.

FIG. 2 is a schematic block diagram of an example node/device 200 that may be used with one or more embodiments described herein, e.g., as any of the nodes or devices shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC (where the PLC signal may be coupled to the power line feeding into the power supply) the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. Operating systems 242, portions of which are typically resident in memory 240 and executed by the processor, functionally organizes the device by, inter alia, invoking operations in support of software processes and/or services executing on the device. These software processes and/or services may comprise routing process/services 244 and an illustrative "learning machine" process 248, which may be configured depending upon the particular node/device within the network 100 with functionality ranging from intelligent learning machine algorithms to merely communicating with intelligent learning machines, as described herein. Note also that while the learning machine process 248 is shown in centralized memory 240, alternative embodiments provide for the process to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols, as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnects are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" (or "Internet of Everything" or "IoE") may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs), FARs, or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Also, a directed acyclic graph (DAG) is a directed graph having the property that all edges are oriented in such a way that no cycles (loops) are supposed to exist. All edges are contained in paths oriented toward, and terminating at, one or more root nodes (e.g., "clusterheads" or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent. DAGs may generally be built (e.g., by a DAG process and/or routing process 244) based on an Objective Function (OF). The role of the Objective Function is generally to specify rules on how to build the DAG (e.g. number of parents, backup parents, etc.).

Figure 3:
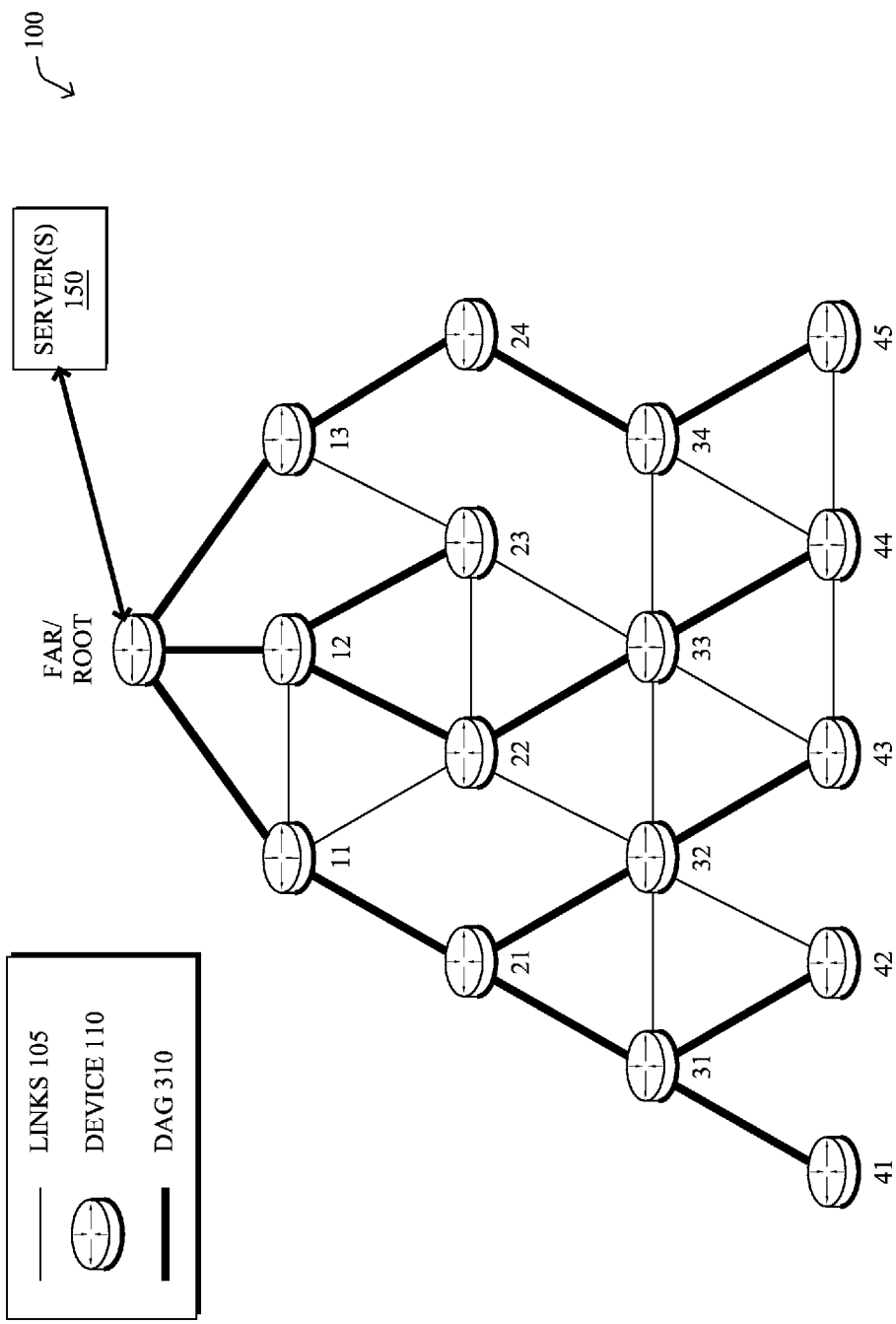
FIG. 3 illustrates an example directed acyclic graph (DAG) in the communication network of FIG. 1.

FIG. 3 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 310 (shown as bolded lines), which extends from the root node toward one or more leaf nodes (nodes without children). Traffic/packets 140 (shown in FIG. 1) may then traverse the DAG 310 in either the upward direction toward the root or downward toward the leaf nodes, particularly as described herein.

RPL supports two modes of operation for maintaining and using Downward routes:

1) Storing Mode: RPL routers unicast DAO messages directly to their DAG Parents. In turn, RPL routers maintain reachable IPv6 addresses for each of their DAG Children in their routing table. Because intermediate RPL routers store Downward routing state, this mode is called Storing mode.

2) Non-Storing Mode: RPL routers unicast DAO messages directly to the DAG Root. The DAO message also includes the IPv6 addresses for the source's DAG Parents. By receiving DAO messages from each RPL router in the network, the DAG Root obtains information about the DAG topology and can use source routing to deliver datagrams.

Unlike Storing mode, intermediate RPL routers in Non-Storing mode do not maintain any Downward routes.

Learning Machine Technique(s)

As noted above, machine learning (ML) is concerned with the design and the development of algorithms that take as input empirical data (such as network statistics and performance indicators), and recognize complex patterns in these data. One very common pattern among ML algorithms is the use of an underlying model M, whose parameters are optimized for minimizing the cost function associated to M, given the input data. For instance, in the context of classification, the model M may be a straight line that separates the data into two classes such that $M=a*x+b*y+c$ and the cost function would be the number of misclassified points. The ML algorithm then consists in adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

As also noted above, learning machines (LMs) are computational entities that rely on one or more ML algorithms for performing a task for which they have not been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficient management by a network operator. Thus far, LMs have not generally been used in LLNs, despite the overall level of complexity of LLNs, where "classic" approaches (based on known algorithms) are inefficient or when the amount of data cannot be processed by a human to predict network behavior considering the number of parameters to be taken into account.

Artificial Neural Networks (ANNs) are a type of machine learning technique whose underlying mathematical models were inspired by the hypothesis that mental activity consists primarily of electrochemical activity between interconnected neurons. ANNs are sets of computational units (neurons) connected by directed weighted links. By combining the operations performed by neurons and the weights applied by their links, ANNs are able to perform highly non-linear operations on their input data.

The interesting aspect of ANNs, though, is not that they can produce highly non-linear outputs of the input. The truly interesting aspect is that ANNs can "learn" to reproduce a predefined behavior through a training process. This capacity of learning has allow the successful application of ANNs to a wide variety of learning problems, such as medical diagnostics, character recognition, data compression, object tracking, autonomous driving of vehicles, biometrics, etc.

Learning in ANNs is treated as an optimization problem where the weights of the links are optimized for minimizing a predefined cost function. This optimization problem is computationally very expensive, due to the high number of parameters to be optimized, but thanks to the backpropagation algorithm, the optimization problem can be performed very efficiently. Indeed, the backpropagation algorithm computes the gradient of the cost function with respect to the weights of the links in only one forward and backward pass throw the ANN. With this gradient, the weights of the ANN that minimize the cost function can be computed.

Denial of service (DoS) is a broad term for any kind of attack aiming at, by any means, making a particular service unavailable (be it a certain application running on a server or network connectivity itself). This is usually performed by bringing the target's resources to exhaustion (again, target resources may range from bandwidth to memory and CPU).

In greater detail, a DoS attack may consist in flooding a target network with hundreds of megabits of traffic (volume based DoS), exhausting a server state by opening a large number of TCP connections (SYN flooding), or by making an HTTP server unavailable by sending it an overwhelming number of requests. An attack may be more subtle and exploit well-known vulnerabilities in the target system (e.g. a large number of fragmented IP packets may exhaust the resources of a router).

Nowadays, DoS attacks are mostly distributed, i.e., they are carried out by multiple sources at the same time, thus making it more difficult to track. In many cases, botnets (i.e. armies or infected hosts spread across the network and under the control of a single master) are used for mounting DoS attacks. In addition, source addresses used for attacks can be spoofed, so that blocking an offending address is potentially useless.

In general, DoS attacks are easy to detect when they are brute-force, but, especially when highly distributed, they may be difficult to distinguish from a flash-crowd (i.e. an overload of the system due to many legitimate users accessing it at the same time).

Statistics and machine learning techniques have been proposed for detecting attacks at the server or network level. Some approaches try to analyze changes in the overall statistical behavior of the network traffic (e.g. the traffic distribution among flow flattens when a DDoS attack based on a number of microflows happens). Other approaches aim at statistically characterizing the normal behaviors of network flows or TCP connections, in order to detect significant deviations.

However, the Internet of Things (IoT) represents a completely different scenario and requires novel detection and reaction strategies. Its highly distributed nature implies that there is no central vantage point from which an attack can be observed. In addition, the scarce resources of the IoT force reporting from the nodes to a central location to be reduced to a minimum.

On top of the lack of global information, detecting DoS in the IoT is made harder by the fact that a much more subtle interference of the network's operations may be enough to bring the network down. For example, a jamming node can prevent a node from decoding traffic by just emitting short bursts when activity on the channel is detected. This can isolate a large portion of the network which uses that node as a parent and cut off a large portion of the network. In addition, in the case of battery operated nodes, a slow but steady flow of malicious traffic can exhaust a node's battery, thus making the node useless in a matter of days.

Due to the high variability of this kind of network, the symptoms of those attacks are not easy to detect and can be lost in the normal noise of the network behavior (traffic peaks and topology changes are quite normal in LLN). Therefore, an intelligent approach is needed that is able to reveal subtle changes in the measured data that are typical of a known anomalous behavior.

—Possible Attacks Against IoT—

Even though the existing literature regarding possible attack types against the IoT is limited, a number of attacks against sensor network technologies may apply with a few minor modifications. Such attacks can be roughly classified into two classes: 1.) insider attacks (i.e., where the malicious node needs to be authenticated and be in possession of the network encryption keys), and 2.) outsider attacks (i.e., where the attacker just needs to be within the radio range of the victims).

In particular, a number of attacks against routing performed by a malicious node in the DAG can be imagined. A node can, for example, perform selective forwarding. In other words, the node could just discard some of the traffic messages that it is asked to forward, while still participating correctly within the routing protocol. Although this can potentially be revealed by end-to-end mechanisms, detection of this type of attack can be difficult and slow due to the low traffic rate and lossiness of IoT networks. Other example attacks include a malicious node impersonating multiple identities or advertising forged routing information, so as to gain a central role in the routing topology.

While attacks belonging to the former class can be prevented through well-designed cryptography and authentication, in the latter case they have to be detected by monitoring the network environment.

The simplest form of attack that can be performed against an RF network is jamming. This consists in artificially creating an interference, so as to prevent message decoding. There are several variations of a jamming attack, with different degrees of complexity and subtlety. The attacker can continuously emit power on the spectrum (continuous jamming), create a collision when it detects activity on the channel (reactive jamming), or attack only a particular type of traffic (selective jamming). The damage from a jamming attack can be maximized if the attacker is able to estimate the centrality of a node in the routing topology. This can be obtained by accounting for the amount of traffic transmitted and received by each node, by leveraging the fact that the link layer addresses are in clear. Once the jammer has detected the most central node, it can try to make this node unreachable for its descendants, which will in turn be forced to select another parent. This can potentially create continuous route oscillations and convergences.

Other kinds of external DoS attacks can be performed by exploiting the fact that a number of messages in the WPAN do not need authentication, such as discovery beacons and some of the EAPoL messages used for authentication. In particular, discovery beacons can be used for injecting false synchronization information into the network, so as to prevent two nodes from meeting on the right unicast communication frequency. EAPoL authentication messages, instead, have to be relayed by the WPAN nodes up to the FAR, and from there until the AAA server. This mechanism allows an attacker to generate routable traffic, thus flooding the network and wasting bandwidth and processing power. A mitigation strategy may to have authentication requests be rate-limited. However this may result in legitimate nodes being prevented from authenticating when an attack is in progress.

Other attacks can be performed against networks that use the 802.11i protocol, which is used for exchanging key information between the authenticating node and the FAR (and therefore, cannot be protected by link layer encryption). Such attacks are documented in the scientific literature and aim at blocking the handshake between the client and the access point. This can be achieved by an attacker by interleaving a forged message between two messages in the handshake. This implicitly resets the handshake state, so that subsequent messages from the authenticating node are discarded.

—Frequency-Hopping and Synchronization in 802.15.4—

In a channel-hopping mesh network, devices communicate using different channels at different times. To communicate a packet, a transmitter-receiver pair must be configured to the same channel during packet transmission. For a transmitter to communicate with a receiver at an arbitrary time in the future, the transmitter and receiver must synchronize to a channel schedule that specifies what channel to communicate on and at what time. Channel schedules may be assigned to each transmitter-receiver pair independently so that neighboring transmitter-receiver pairs can communicate simultaneously on different channels. Such a strategy increases aggregate network capacity for unicast communication but is inefficient for broadcast communication. Alternatively, all devices in a network may synchronize with a single channel schedule such that all devices transmit and receive on the same channel at any time. Such a strategy increases efficiency for broadcast communication since a single transmission can reach an arbitrary number of neighbors, but decreases aggregate network capacity for unicast communication since neighboring individual transmitter-receiver pairs cannot communicate simultaneously without interfering. Mesh networks typically utilize both unicast and broadcast communication. Applications use unicast communication to communicate data to a central server (e.g. AMI meter reads) or configure individual devices from a central server (e.g. AMI meter read schedules). Network control protocols use unicast communication to estimate the quality of a link (e.g. RSSI and ETX), request configuration information (e.g. DHCPv6), and propagate routing information (e.g. RPL DAO messages). Applications use multicast communication for configuring entire groups efficiently (e.g. AMI meter configurations based on meter type), downloading firmware upgrades (e.g. to upgrade AMI meter software to a newer version), and for power outage notification. Network control protocols use multicast communication to discover neighbors (e.g. RPL DIO messages, DHCPv6 advertisements, and IPv6 Neighbor Solicitations) and disseminate routing information (e.g. RPL DIO messages). Existing systems optimize for both unicast and broadcast communication by synchronizing the entire network to the same channel-switching schedule and using a central coordinator to compute and configure channel schedules for each individual device, or else more efficiently optimizing for both unicast and broadcast communication in a channel-hopping network without need for centrally computing schedules for individual nodes.

In order to join the WPAN enabled with frequency hopping (e.g., an 802.15.4 WPAN), a node needs to synchronize on the frequency hopping schedule of its neighbors. Therefore, each node in the WPAN broadcasts its unicast reception schedule via a discovery beacon, which is not encrypted and sent on every frequency: this allows nodes joining the PAN to join. In greater detail, the discovery beacon message is sent a broadcast destination WPAN and includes several information elements, most notably:

The WPAN SSID string

The unicast scheduling information. In one implementation, this is made up of a slot number and an offset value. This allows the receiving node to compute the slot number the sending node is currently is, and thus, by applying a hash function, to know its current receiving frequency. Note that this algorithm does not require the clocks of the two nodes to be synchronized.

The transmission of a discovery beacon is triggered by an associated trickle timer. However, the information about the scheduling of the broadcast slot is not included in such a beacon, but only in the synchronous and unicast beacons, which are encrypted with the network key. In particular, the synchronous beacon is triggered by a trickle timer and it is sent on every frequency (just as the discovery beacon). The unicast beacon, on the contrary, is sent upon request by another node by using a standard unicast transmission. In both cases, the beacon includes a broadcast scheduling information element, which has the same format of the unicast scheduling IE (Information Element). As a consequence, an attacker can interfere with its target during its unicast slot, but ignores the broadcast frequency schedule: the broadcast schedule is therefore much better protected against DoS attacks.

—802.15.4 Security—

Currently, IoT architecture comes with several embedded security mechanisms. The cornerstone of IoT security is indeed link layer encryption, which is mandatory for most frames (including routing messages and application traffic). Besides pure encryption, link layer security ensures message integrity (through an encrypted MAC code) and message non-replication (through an encrypted sequence number included in the encrypted message payload).

In order to install the necessary link layer keys on every node, an authentication procedure is carried out when the node joins the network. Such a procedure is based on the EAPOL protocol, which is carried directly over layer 2 messages and is used for transporting authentication data from the node to the FAR (notice that such messages are not encrypted). On top of EAPOL, two main protocols are carried: EAP messages, which the FAR tunnels to an AAA server through the RADIUS and 802.11i messages, which are used for exchanging cryptographic material between the FAR and the node.

In greater detail, EAP messages are used by the node for mutual authentication with the AAA server and securely agree on a shared secret; to this end, a complete TLS handshake is, in turn, tunneled over EAP messages and a public key mechanism based on X509 certificates is used for identity validation. Once such shared secret has been established, the AAA server transmits it to the FAR, which, in turn, uses it for exchanging the link layer keys with the node through the 802.11i protocol.

Notice that the shared secret negotiated through EAP is stored by the node in persistent memory and can be reused for subsequent authentication (in this case, EAP is skipped and the link layer key is directly exchanged through 802.11i).

Cross-Validation of a Learning Model Between Network Devices

As noted above, Learning Machines (LMs) provide powerful tools in numerous networking applications such as anomaly detection, attack detection, closed loop control, etc. During their training process, LMs learn patterns from training data and the performance of the LM is directly related to the quality of this training data. Various strategies for collecting training data for these LMs in the context of attack detection have been introduced, but the performance of LMs does not depend uniquely on the quality of the training data. Indeed, the training process is also very important and it influences considerably the generalization of the obtained LM.

Generalization, in machine learning, is the capacity of a learning machine model to perform accurately on new and previously unseen data after the training process. One of the main causes of a poor generalization is the "overfitting" of the model to the data. Overfitting is the phenomenon of fitting the model to the noise present in a dataset, thereby losing the information of the underlying process that generated this data. For the particular case of ANNs, overfitting typically appears when the fitting error on the training is reduced too much in the presence for example of a number of hidden neurons too big with respect to the complexity of the process that wants to be learnt. Overfitting is a real issue since the model inherently captures the noise in the training set, which will induce lots of errors in unseen data near the border region.

An example of an overfitted LM model (e.g., a machine learning classifier) is shown in FIG. 4. As shown, a feature space 400 may include any number of data points 402 to be classified by the LM model. For example, data points falling on one side of the classification function may be considered to be indicative of a certain type of network event while data points falling on the other side of the classification function may indicate that the event is not present. Due to noise inherent in the data, classifier 404 may be overfitted to the feature data, in comparison to a classifier 406 that exhibits generalization.

Overfitting may be controlled using cross-validation. Cross-validation may entail randomly discarding some samples from the training process and evaluating the trained LM on these discarded samples that form a validation set. This way, the LM is evaluated on data that it has not seen during its training and therefore the generalization power of the LM can be estimated. This approach presents two main drawbacks. First, by splitting the training set in these two sets (training and validation) the size of the training set is reduced, which can be a serious problem depending on the amount of data. Second, this way of evaluating the generalization power can be biased if the original set is not heterogeneous enough.

The techniques described herein, therefore, are directed to a collaboration mechanism between two or more different network nodes/devices for performing a physically distributed cross-validation for training an LM model, such as an ANN. In many implementations using the techniques herein, the LM model is constructed and executed on a field area router (FAR). However, it is to be appreciated that a FAR in the context of describing the techniques herein is used as a generic term of the router/switch used to host a LM in a network. The mechanism establishes a procedure for transferring a (partially) trained ANN or other LM model from a FAR (i.e., the Requesting FAR (RF)) to another FAR (i.e., the Validating FAR (VF)) that performs a local validation of the model. This provides a sharp contrast with standard and existing technique for cross-validation. On the one hand, the training set does not need to be reduced since the validation is performed in another FAR with another dataset. On the other hand, the heterogeneity of the data is assured from the fact that the validation set consists on data independently collected by a different FAR in a different network, still of similar characteristics. Such an approach thus avoids the effect of overfitting.

Said differently, an aim of the techniques herein is to propose an approach consisting in performing a distributed cross-validation of a computed LM model such as an Artificial Neural Network in a network. After dynamically selecting a remote router/network node hosting a LM model of similar type such as an ANN, a local router/network node start a training process using local data for a dynamically adjustable period of time, at which point, it sends the computed ANN or ML model to the selected remote router for cross-validation (i.e., the parameters of the model are sent for validation). In one embodiment, the use of a closed-loop feed-back between the Requesting LM and the Validation LM allows for detecting an overfitting situation using two different large sets of data. In other words, the techniques herein provide a dynamic mechanism for avoiding an overfitting situation that can take place when learning is performed in isolation, using a number of network and node characteristics in contrast with existing approach. While ANNs are used herein as a primary example, the techniques herein are not limited to the use of ANNs and can be used for various types of LMs used in distributed systems, such as Support Vector Machines (SVMs). Furthermore, the techniques disclosed herein are agnostic to the application to which the LM model is trained (e.g., to detect network attacks, estimate performance, estimate network parameters, detect anomalies, etc.) and can be applied to any number of different LM models.

Notably, cross-validation is a technique for estimating the capacity of generalization of a LM, i.e., its real performance. The cross-validation works as follows. Given a dataset for training a LM, the whole set is divided in two separated subsets: 1.) the training set and 2.) the validation set. Then, the LM model is trained using only the samples in the training set and, once the training is done, the performance of the obtained LM is evaluated in the validation set. For improving the estimation of the LM performance, multiple cross-validations are usually performed, using different partitions of the original dataset. In the particular context of ANNs, cross-validation is usually applied as a stop criterion for the training. Indeed, a typical ANN training scenario keeps track of the training and validation errors while iterating on the training algorithm. At the beginning both the training and the validation errors decrease, but at a certain point the validation error starts to increase while the training error keeps decreasing. This is a clear indicator of overfitting and then the training process must be stopped. In the techniques herein, however, the solution proposes to distribute the cross-validation process for avoiding overfitting in training across different FARs. This has two potential benefits: avoiding reduction of the training data and variability between the training and validation sets. Indeed, by outsourcing the validation to a different FAR with an independently collected dataset, the training set does not need to be reduced and the independence between training and validation sets is assured.

Specifically, according to one or more embodiments as described in detail below, a first network device receives a notification that the first network device has been selected to validate a machine learning model for a second network device. The first network device receives model parameters for the machine learning model that were generated by the second network device using training data on the second network device. The model parameters are used with local data on the first network device to determine performance metrics for the model parameters. The performance metrics are then provided to the second network device.

Operationally, the techniques herein provide for a Requesting FAR (RF) hosting a LM model to request that a validation FAR (VF) cross-validate the LM that has been locally trained using data local to the VF.

—Validation FAR Discovery—

Figure 5A:
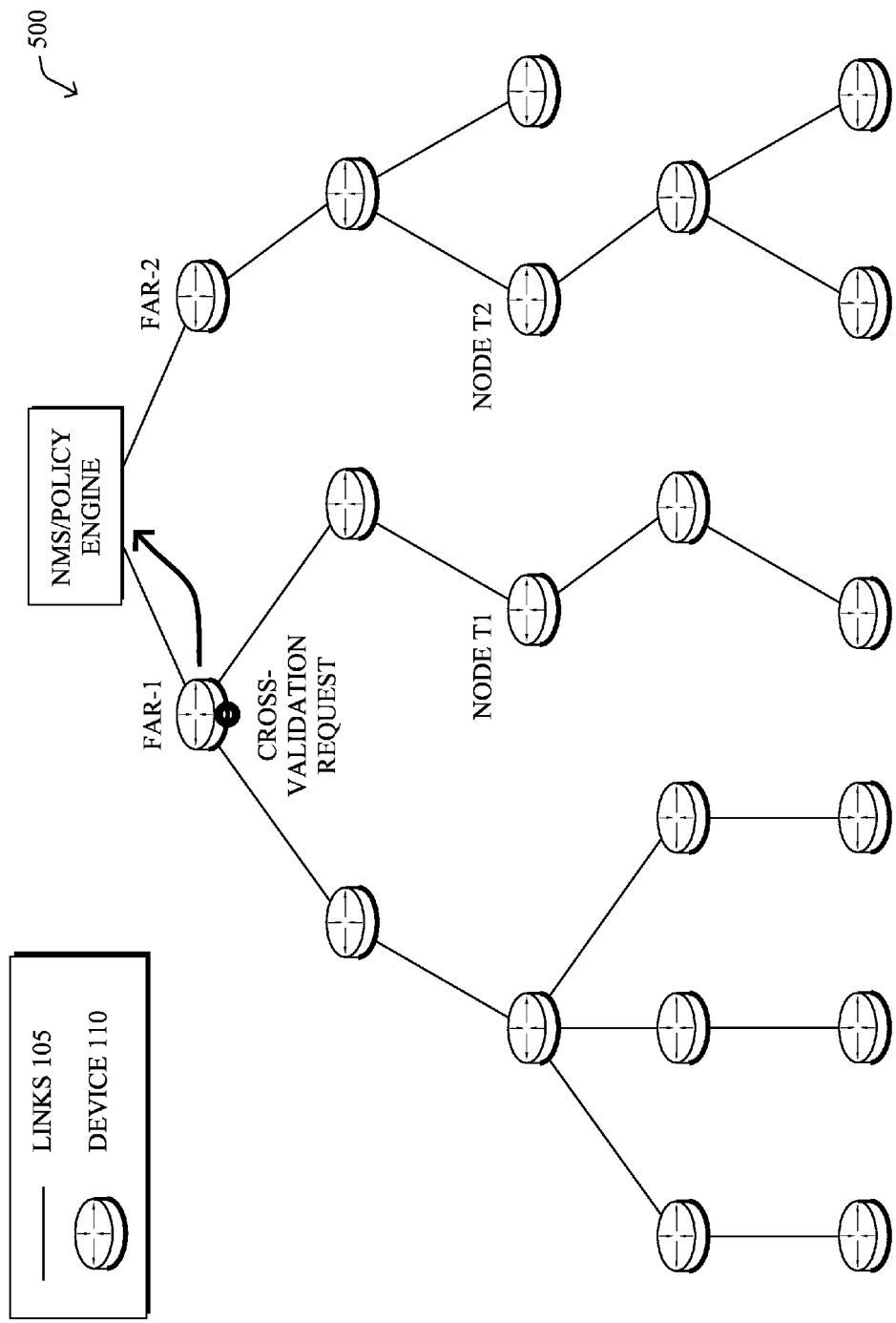
FIGS. 5A-5C illustrate an example of a network device/node requesting cross-validation of a machine learning model from a policy engine.
Figure 5B:
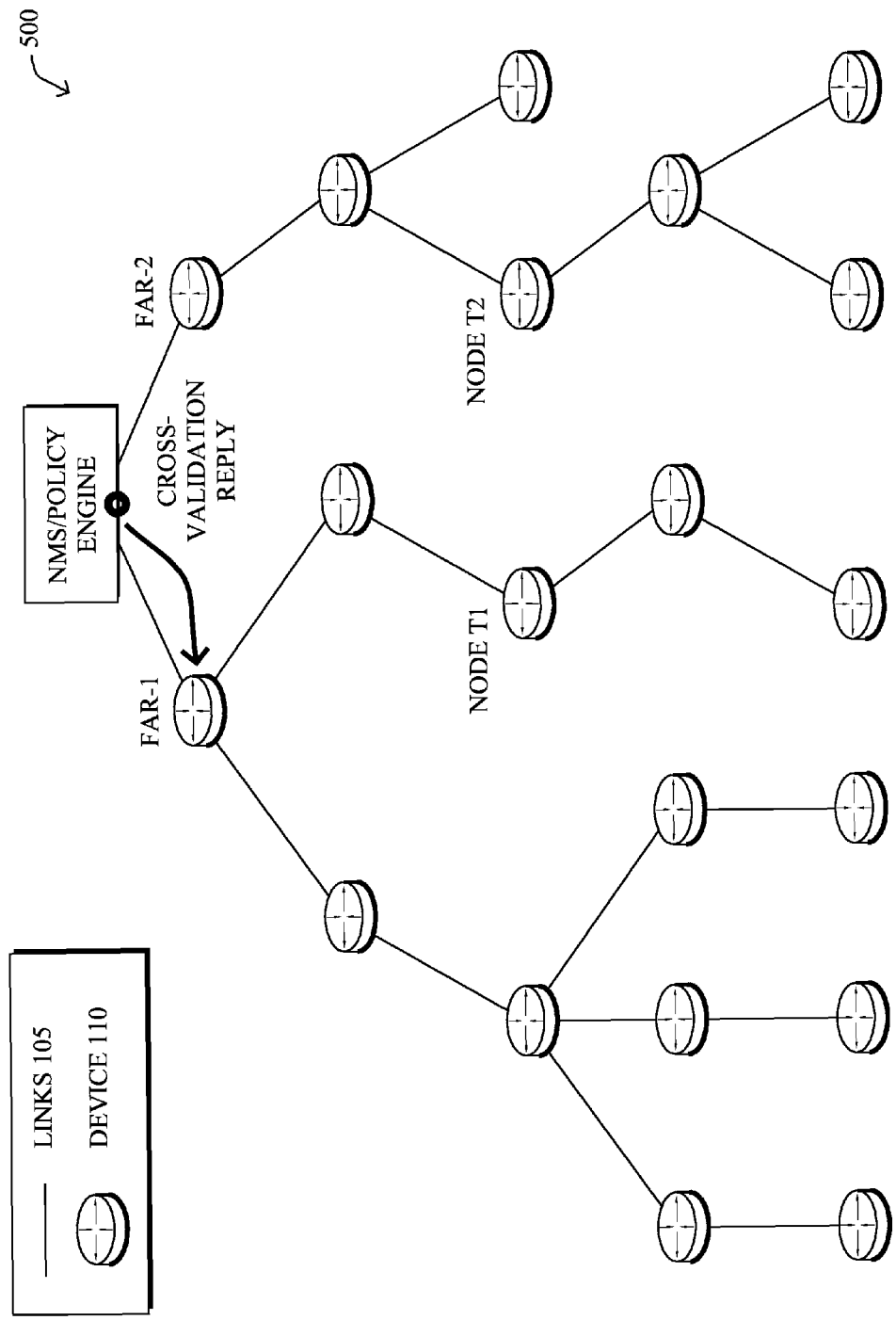
Figure 5C:
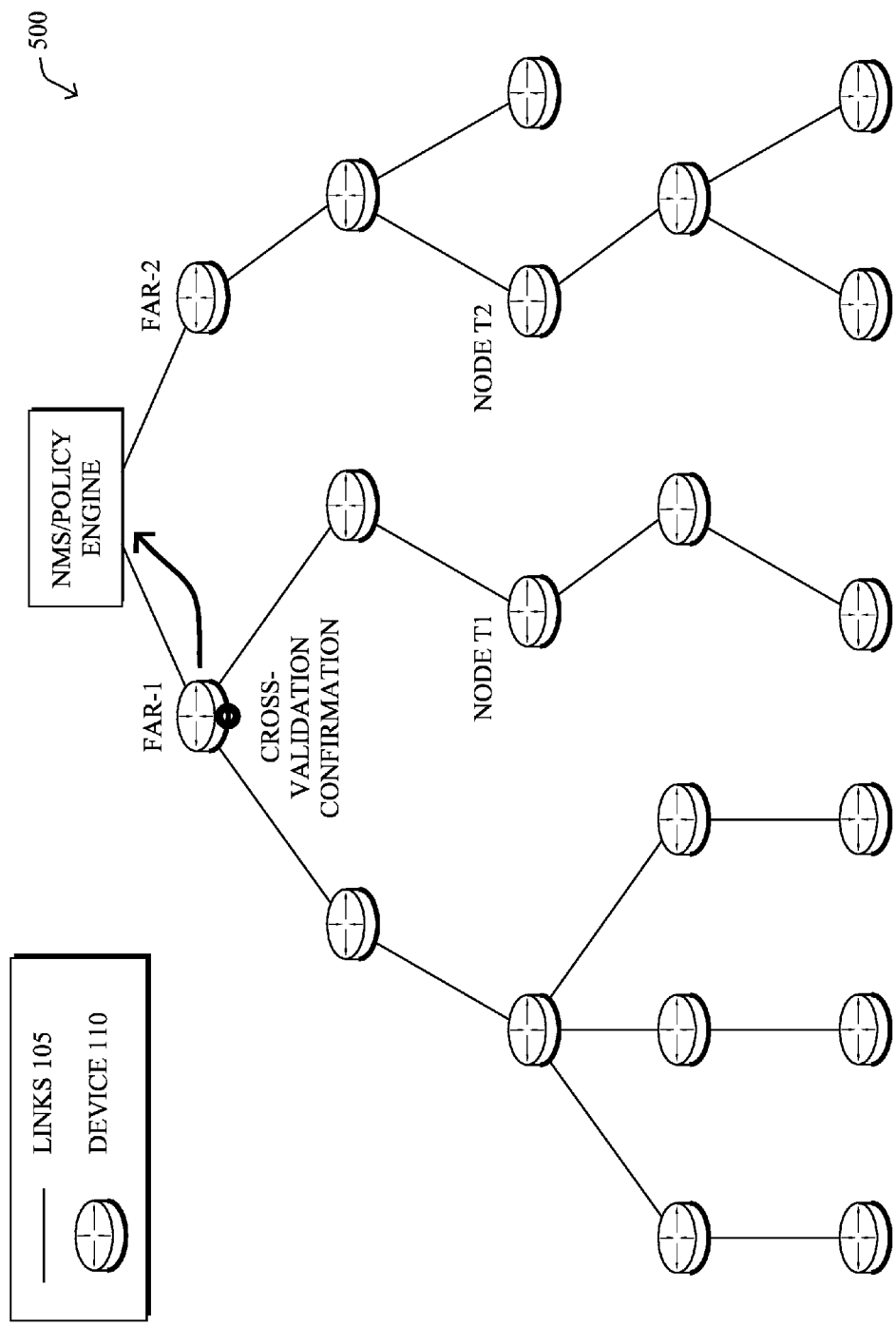

The first component of the techniques herein performs a discovery of a potential Validation FAR (VF) that the RF can contact. In one embodiment, the RF either "discovers" potential VF upon registration or requesting the NMS to provide a list of candidates. To that end, the techniques herein specify a newly defined CoAP unicast IPv6 message named the CV_Req (Cross-Validation Request) sent by the RF to the NMS in order to get in return the list of candidate VFs. For example, as shown in FIGS. 5A-5C, an RF (e.g., FAR-1) can send a cross-validation request to an NMS/policy engine to identify nodes/devices eligible to perform the validation.

An NMS or other device that receives a cross-validation request may take into account a series of attributes such as, but not limited to, the type of network the potential VF is connected to (e.g., for the cross-validation to be performed on a network with similar characteristics), the VF's attributes (e.g., CPU power, memory, etc.), the location of the RF (e.g., in order to minimize the traffic flowing between the RF and VF, should the network be constrained although the extra traffic is not expected to be heavy), or other form of policy (e.g., confidentially, ability to act as a helping routers, etc.).

In one embodiment, a CV_Req message is made of a series of TLVs characterizing the request (cross-validation). More specifically, a cross-validation request may include any or all of the following for an ANN:

The input features of the ANN, i.e. the data that the input layer of the ANN receives.

The activation function performed on the neurons.

The output of the ANN, which can be a label or group of labels, an estimation of a certain parameter or group of parameters, an estimation of a feature or group of features, etc.

The constraints that have to be applied to the validation data, if any. Indeed, a router can be interested in validating an ANN against data responding to certain constraints. For instance, if the RF manages a network with a certain predefined minimum RSSI value, it will be interested in validating its ANN with data satisfying this constraint. Note that such a TLV is generic enough to characterize other forms of Learning Machine such as a SVM, according to various other embodiments.

In another embodiment of this component, the discovery of eligible VFs may be distributed and dynamic. To that end, the RF may send a multicast message to a well-known multicast group (e.g., all-FAR-hosting-LM) comprising the same set of TLVs as shown above. In such a case, the request for cross-validation is similar (e.g., by specifying the ANN characteristics computed by the RF, etc.) to the NMS-based approach but the discovery is dynamic and distributed, allowing for a real-time selection of the candidate VF. Indeed, a potential router may not be available to "help" for cross-validation being busy performing other task. For example, as shown in FIG. 6A, the RF (e.g., FAR-1) may send a multicast cross-validation request to any number of other FARs (e.g., FAR-2, etc.).

Figure 6B:
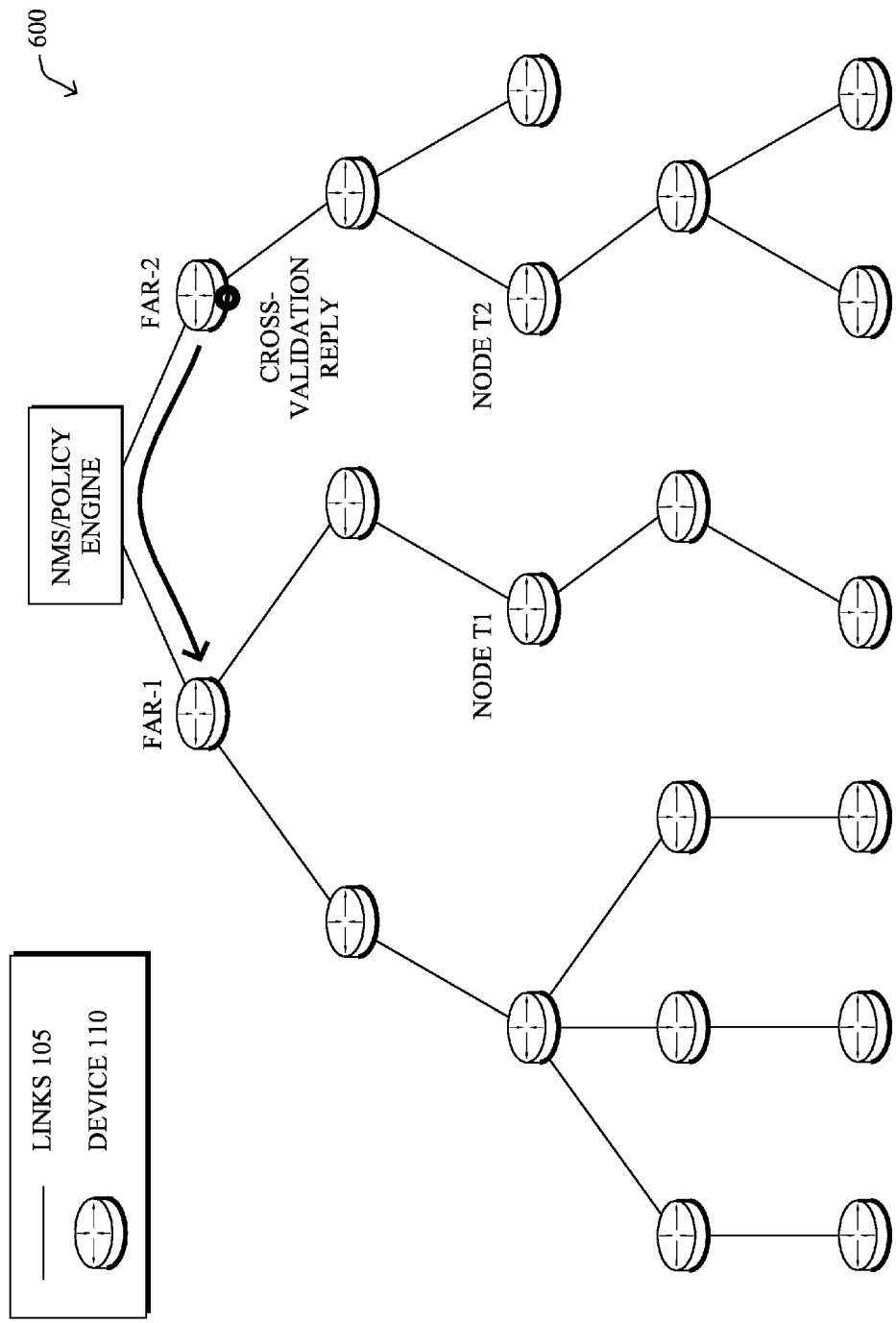

In both of the mechanisms highlighted above, the NMS (centralized case) or a set of dynamically discovered routers (distributed case) send a CV_Rep (Cross-validation Reply) message to the RF. For example, as shown in FIG. 5B, the NMS may send a cross-validation reply back to the requesting FAR-1. Similarly, as shown in FIG. 6B, the other FAR-2 may send the cross validation reply back to the requesting FAR-1 (e.g., if the router can indeed act as a helper considering the local resources required to perform the cross-validation, for example considering the structure of the ANN such as the number of layers, number of neurons per layer, etc.). In one embodiment, a CV_Rep message includes any or all of the following information:

A description of the available data (e.g., histograms, multidimensional histograms, principal components of the dataset, etc.)

A description of network characteristics (traffic, indoor/outdoor, type of devices, etc.)

—Local Selection of the VF by the RF—

According to various embodiments, once CV_Rep messages have been received by the RF, the RF locally selects the VF of interest. Several criteria can be considered for choosing the VF (i.e., from the list of available/eligible VFs) that will finally perform the validation of the LM. One criterion can be the similarity of the involved networks. Indeed, a router can be interested in validating an ANN on a network that is as similar as possible to its network. Another criterion can be the heterogeneity in the network conditions. For instance, the router trying to validate an ANN, can be managing a network with low traffic and therefore it can be interested in validating the ANN against data from a network with high traffic, in order to know the expected performance of the ANN in the presence of a traffic spike. Another criterion can be the physical conditions of the involved network. For instance, a router managing an indoor network can be interested in validating an ANN on an outdoor network (e.g., a device that is susceptible to disturbances due to weather conditions). This can be useful in the case of presence of nodes that are linking different buildings, and therefore subject to weather disturbances, for instance.

—Indication of a Selected VF—

Figure 6C:
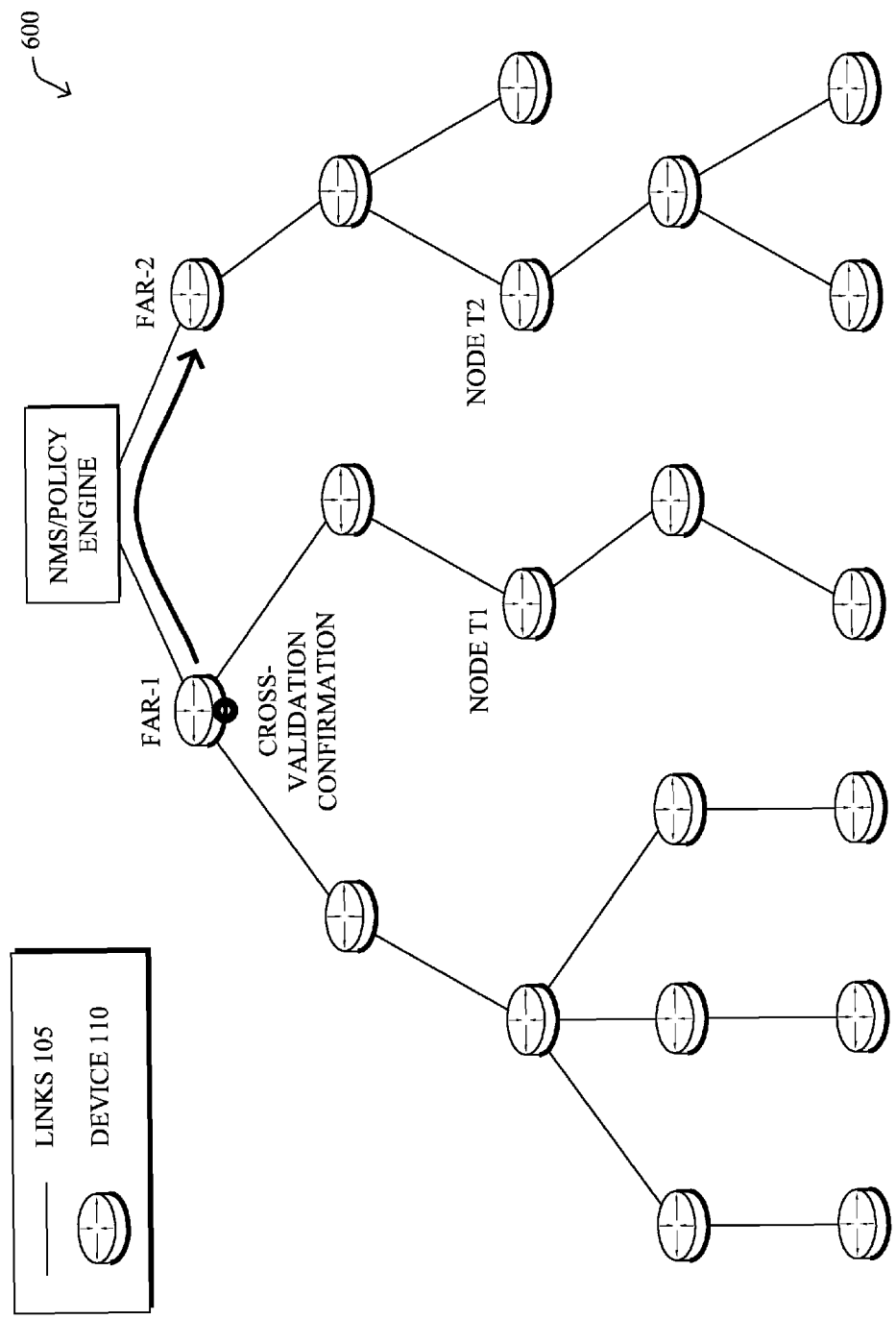

Once the RF has selected a VF that has the most interesting characteristics, it may send a cross-validation confirmation message CV_Conf confirming the selection. For example, as shown in FIGS. 5C and 6C, such a confirmation message may be sent to the NMS/policy engine or directly to the selected FAR (e.g., FAR-2). In one embodiment, the confirmation message may also include the remaining information to perform the cross-validation (e.g., the structure of the ANN, i.e., the connections between neurons and their corresponding weights, or other such machine learning model parameter). In the case of ANNs, this information may correspond to a matrix of weights between all neurons called MRF(t), the set of weights computed by the RF at time t.

—Cross-Validation—

Figure 7A:
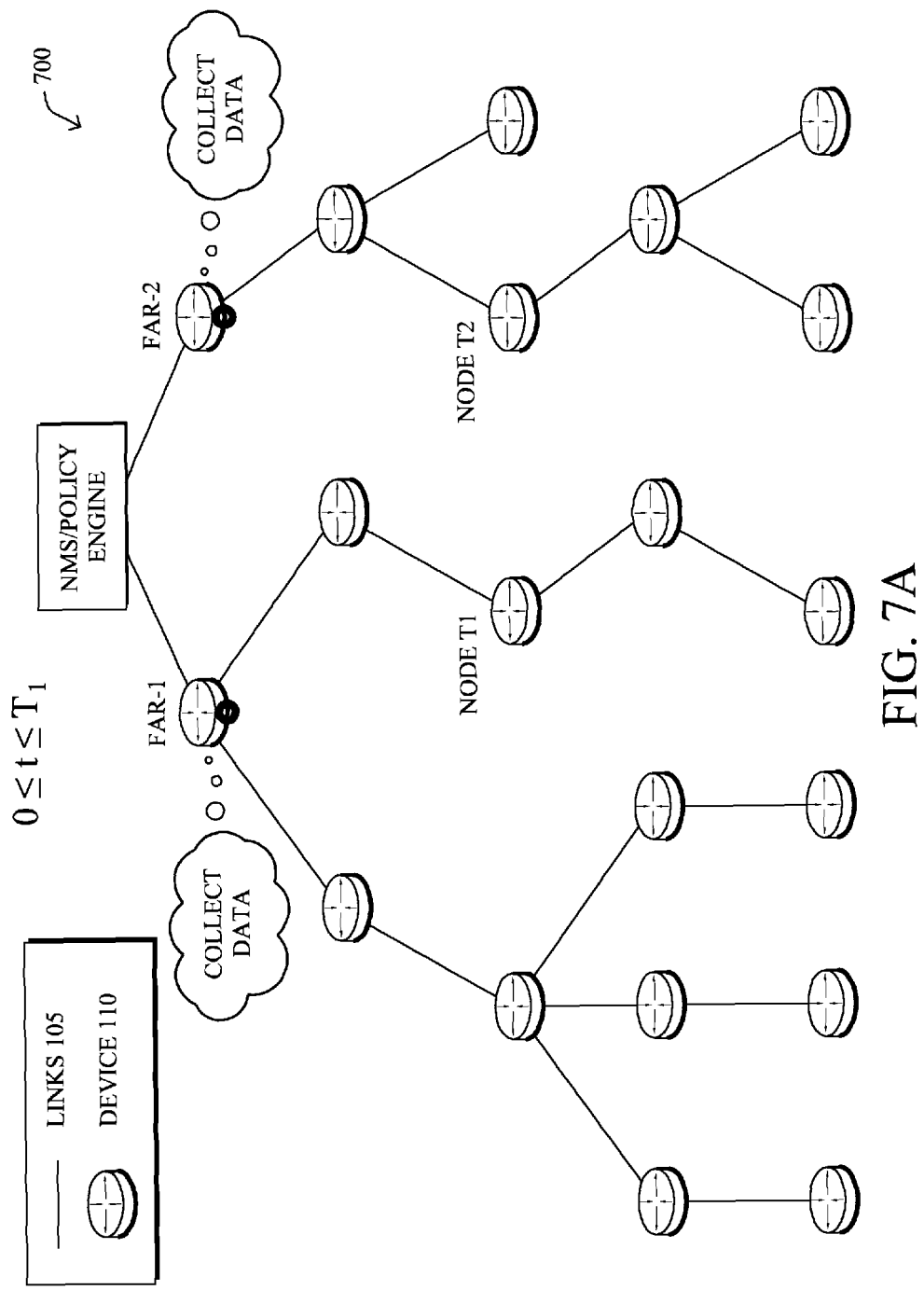
FIGS. 7A-7D illustrate an example of a machine learning model being cross-validated by network devices.
Figure 7B:
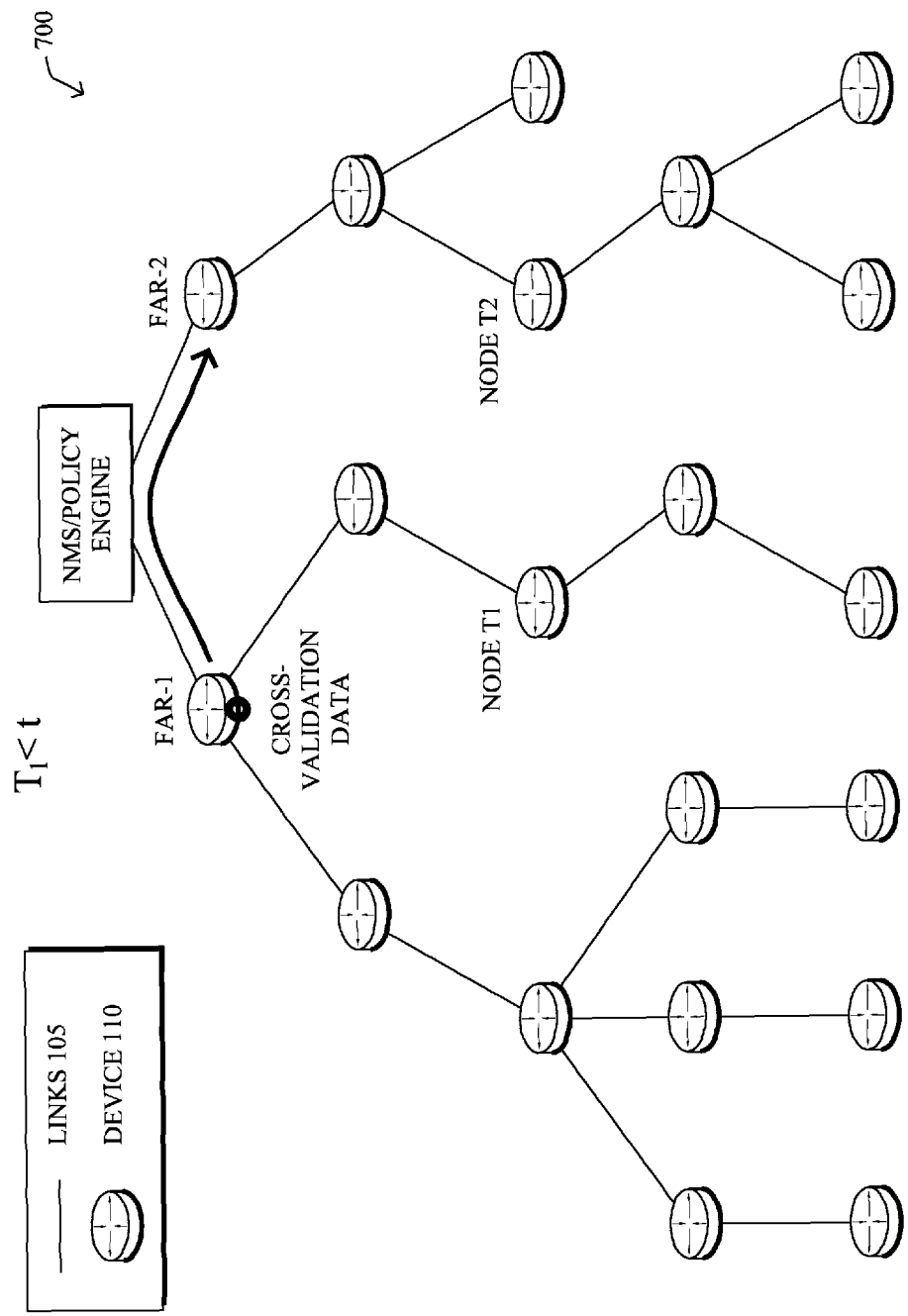
Figure 7C:
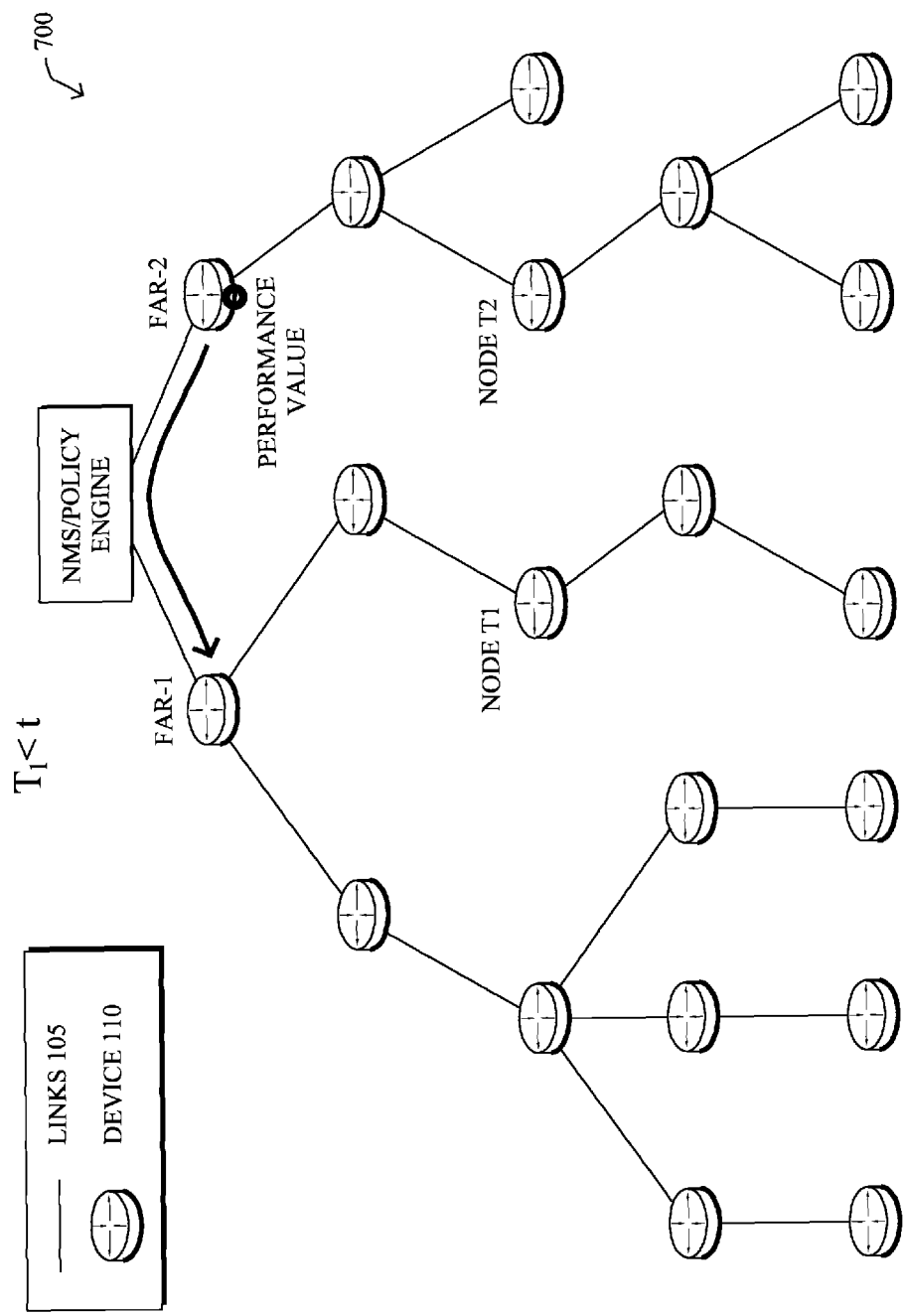

After the VF has been selected and notified of the selection, as illustrated in the examples shown in FIGS. 7A-D, the RF (e.g., FAR-1) may initiate a stop-and-go process between itself and the selected VF (e.g., FAR-2). First, a time period T is selected by the RF. This time period may be dynamically adjustable, in one embodiment. Next, the RF starts training the ANN (or a LM in general) for a period of time T using data collected during this time, as shown in the example of FIG. 7A. After the expiration of the time period T, the machine learning model parameters generated by the RF, such as the matrix MRF(t) of an ANN model, are sent to the selected VF, as shown in the example of FIG. 7B. In one embodiment, the training process of the RF may be stopped until the VF provides feedback regarding the cross-validation to the RF. Once the VF has received all of the cross-validation data (i.e., the learning model parameters) from the RF, the VF may use the received model parameters with data collected locally by the VF to validate the model parameters. In one embodiment, the VF may also apply constraints to the validation data, if any exist, before applying the model to the now filtered data. According to various embodiments, as shown in the example of FIG. 7C, the VF may calculate one or more performance values/metrics to quantify how well the model parameters from the RF fit the local data set of the VF.

As will be appreciated, any number of performance metrics may be calculated by the VF and returned to the RF. For example, the performance of an ANN, SVM, or other model can be measured using precision and recall (e.g., if outputs are labels), a mean squared error (e.g., if the output are feature or parameter estimations), or any other pre-defined performance metric. In one embodiment, the obtained performance value is transmitted to the RF via a unicast message referred to as a Performance Value (PV) message, as shown in FIG. 7C.

Figure 7D:
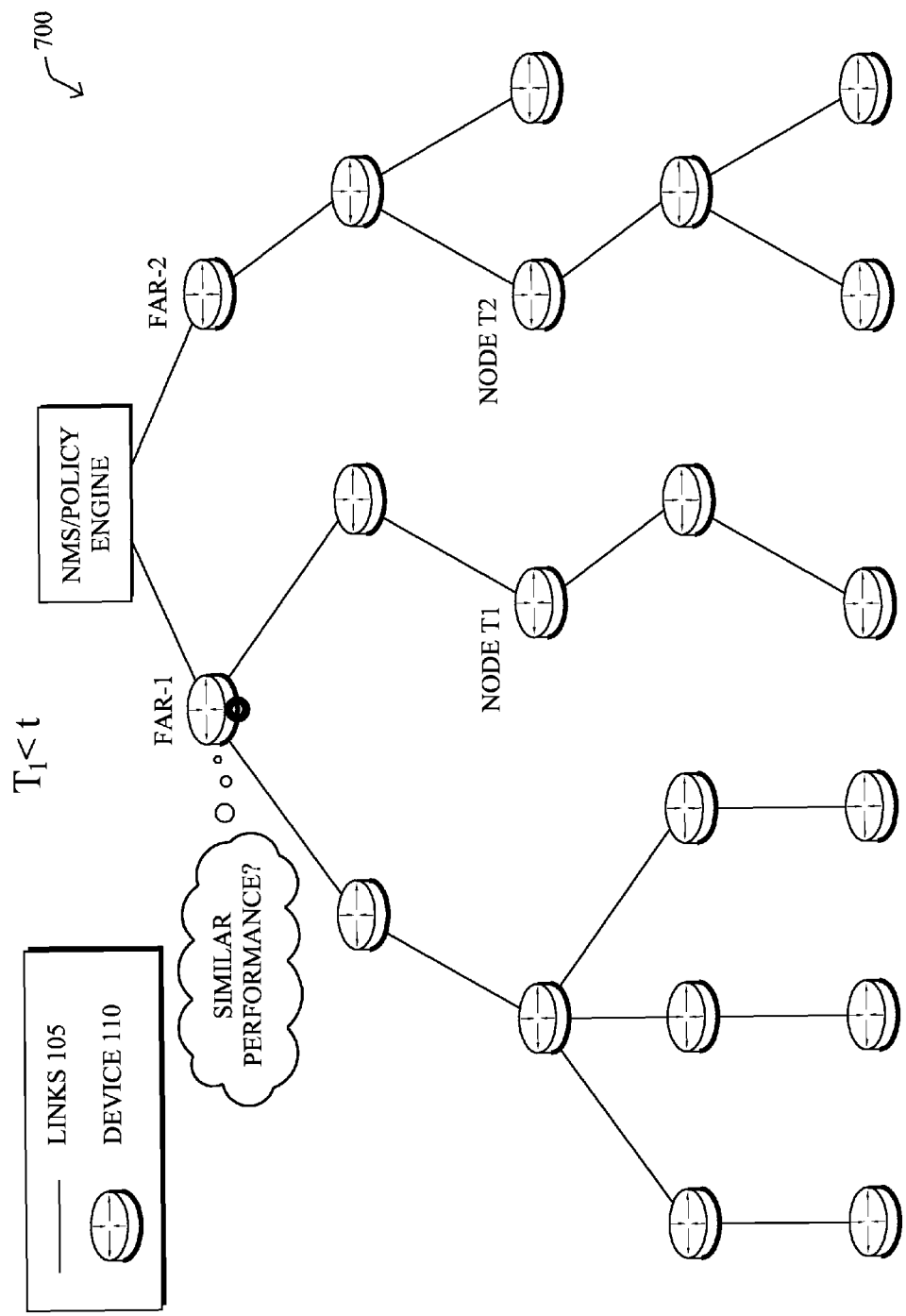

Upon receiving a PV message from the VF, the RF may compare the performance of the model at the VF to the local performance of the model at the RF, as shown in the example of FIG. 7D. At this stage, one of two conditions may exist. If the local and remote PV are similar, the RF may repeat the process and start over by selecting a time period T. In one embodiment, the RF may dynamically adjust the time period T for a subsequent round based on the PV, network state, or other such factors. For example, if the performance is high and the network is congested, the RF may decide to increase the value of T for a subsequent round. However, if the local and remote PV diverge, this may be an indication of overfitting (e.g., the locally computed ANN starts to model local noise), in which case, the RF may step back to the previous set of model parameters (e.g., the value of MRF(t) from the prior time), in one embodiment. In another embodiment, the RF may instead start from the very beginning and reiterate the process with a smaller value for the training steps (i.e., the value of T), if the local and remote performances diverge.

Figure 8:
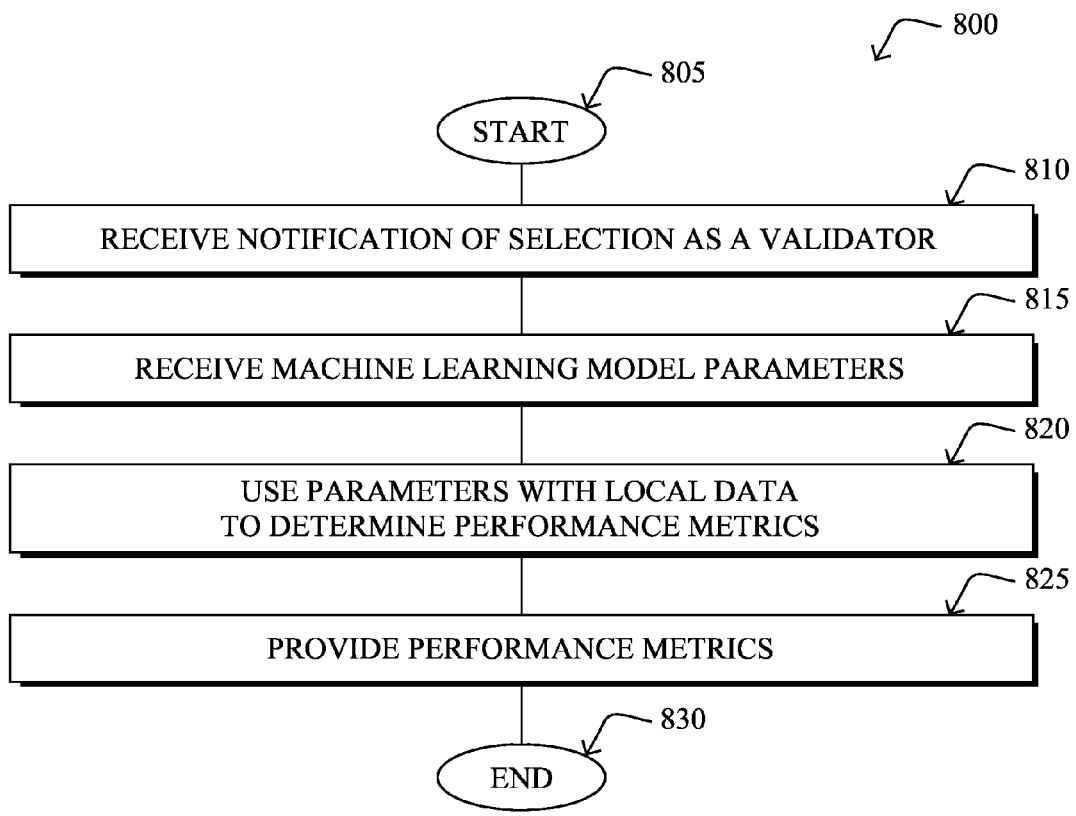
FIG. 8 is an example simplified procedure for validating a machine learning model by a validation device/node.

FIG. 8 illustrates an example simplified procedure for validating a machine learning model from the perspective of a VF (e.g., FAR-2 described above). The procedure 800 may start at step 805, and continue on to step 810, where, as described in greater detail above, a notification is received that the device has been selected as a validator to validate a machine learning model. The procedure 800 continues on to step 815 in which machine learning model parameters are received from another device in the network. In general, the received machine learning model parameters correspond to any parameters that cause a machine learning model to operate in a certain manner and, in many cases, may be trained parameters. For example, machine learning model parameters for an ANN may correspond to information regarding the number of neurons, weighted neuron connections, etc. to be used by the model. At step 820, the model parameters are used with local data collected by the validator and/or the devices in the network of the validator to determine one or more performance metrics for the learning model. As highlighted in greater detail above, for example, a performance metric may be a mean squared error or other metric based on the error rate of the model, a model precision value, a recall value, combinations thereof, or the like. At step 825, the performance metrics are then provided to another device (e.g., the device that generated the model parameters) to perform cross-validation. For example, as detailed above, the device that generated the model parameters may compare its own performance metrics to the received performance metrics, to validate whether the model parameters provide acceptable results for each device's local data set. Procedure 800 then ends at step 830.

Figure 9:
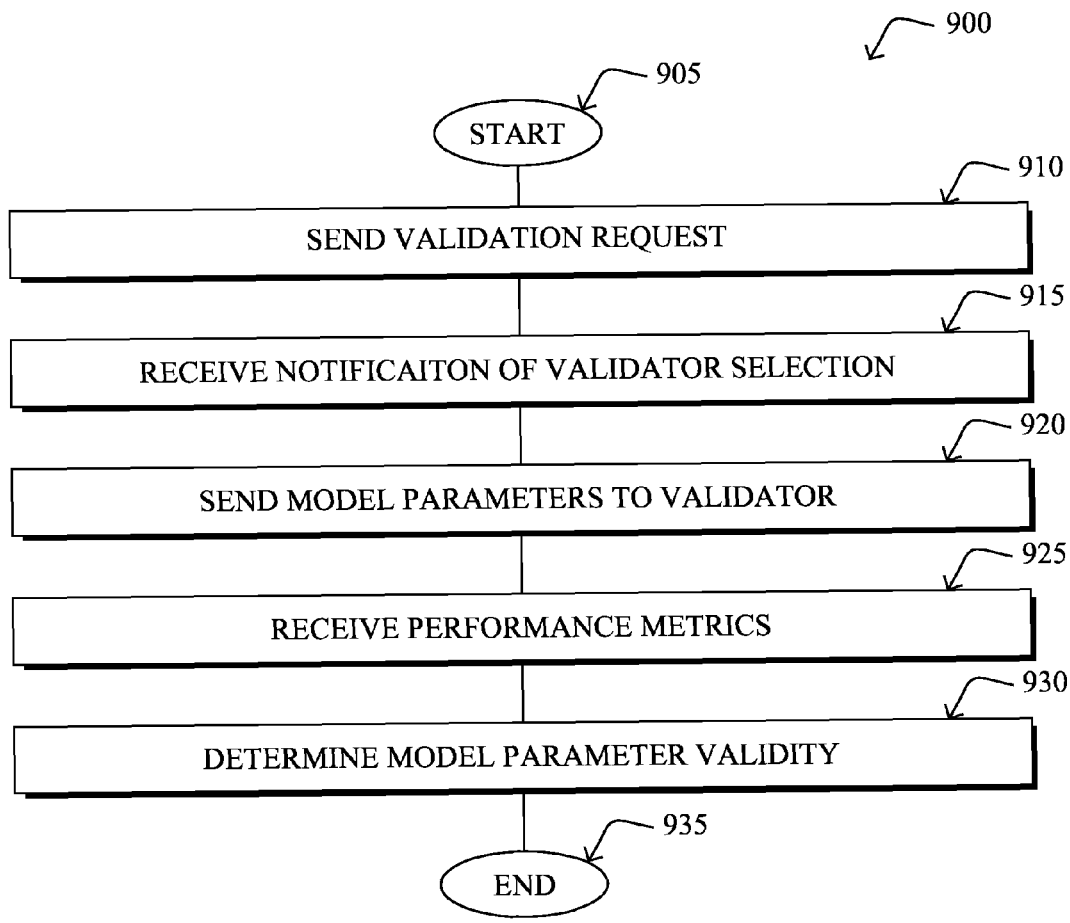
FIG. 9 is an example simplified procedure for cross-validating a machine learning model.

FIG. 9 illustrates an example simplified procedure for cross-validating a machine learning model (e.g., from the perspective of an RF). Procedure 900 may start at step 905, and continues to step 910, where, as described in greater detail above, a validation request is sent to identify a validator for a machine learning model. In step 915, a notification is received that indicates the set of eligible validation devices and/or a particular validation device to perform the validation. As highlighted above, a device may be considered to be an eligible device based on whether the device has resources enough to help with the validation, etc. The procedure 900 then continues on to step 920 where parameters for the machine learning model are sent to the selected validator. As noted above, machine learning model parameters correspond to the parameters that control how the model operates, such as the neurons, connections, and connection weights in an ANN. In step 925, performance metrics are received from the validator. As described in greater detail above, the performance metrics may be generated by the validator by applying the learning model parameters to local data on the validator (e.g., data collected by the validator). In step 930, the validity of the model parameters is determined (e.g., by determining whether the validator's performance metrics diverge from performance metrics determined by the RF). Procedure 900 then ends at step 935.

It should be noted that while certain steps within procedures 800-900 may be optional as described above, the steps shown in FIGS. 8-9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 800-900 are described separately, certain steps from each procedure may be incorporated into each other procedure, and the procedures are not meant to be mutually exclusive.

The techniques described herein, therefore, provide for a distributed architecture for cross-validation of a machine learning model, such as an ANN, between two field area routers. In particular, the techniques herein avoid overfitting during an isolated learning process, which may lead to capturing noise during the learning phase leading to lack of generalization and very poor performance of the machine learning model (e.g., false positive increase, etc.).

Illustratively, each of the techniques described herein may be performed by hardware, software, and/or firmware, such as in accordance with the learning machine process 248, which may contain computer executable instructions executed by the processor 220 (or independent processor of interfaces 210) to perform functions relating to the techniques described herein, e.g., optionally in conjunction with other processes. For example, certain aspects of the techniques herein may be treated as extensions to conventional protocols, such as the various communication protocols (e.g., routing process 244), and as such, may be processed by similar components understood in the art that execute those protocols, accordingly. Also, while certain aspects of the techniques herein may be described from the perspective of a single node/device, embodiments described herein may be performed as distributed intelligence, also referred to as edge/distributed computing, such as hosting intelligence within nodes 110 of a Field Area Network in addition to or as an alternative to hosting intelligence within servers 150.

While there have been shown and described illustrative embodiments that provide for computer network anomaly training and detection using artificial neural networks, generally, it is to be understood that various other adaptations and modifications may be made within the spirit and scope of the embodiments herein. For example, the embodiments have been shown and described herein with relation to LLNs and related protocols. However, the embodiments in their broader sense are not as limited, and may, in fact, be used with other types of communication networks and/or protocols. In addition, while the embodiments have been shown and described with relation to learning machines in the specific context of communication networks, certain techniques and/or certain aspects of the techniques may apply to learning machines in general without the need for relation to communication networks, as will be understood by those skilled in the art.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method, comprising:
 receiving, at a first network device over a computer network, a notification that the first network device has been selected to validate a machine learning model for a second network device, wherein the first network device and the second network device are different routers or servers in the computer network;
 receiving, at the first network device over the computer network, model parameters for the machine learning model that were generated by the second network device using training data on the second network device;
 using the model parameters with local data on the first network device to determine performance metrics for the model parameters, wherein using the model parameters includes using a closed-loop feed-back between the second network device and the first network device to detect overfitting of the machine learning model; and
 transmitting the performance metrics to the second network device to compare the performance metrics determined at the first network device to local performance metrics of the learning machine model at the second network device,
 wherein when the performance metrics transmitted by the first network device diverge from the local performance metrics generated by the second network device, the machine learning model is deemed to be overfit.

2. The method as in claim 1, wherein the machine learning model is an artificial neural network (ANN).

3. The method as in claim 2, wherein the first network device is selected to validate the ANN based on a determination that environmental conditions of the first and second network devices are similar.

4. The method as in claim 1, wherein the performance metrics comprise at least one of:
 a mean squared error, a precision value, or a recall value.

5. The method as in claim 1, wherein the training data on the second network device and the local data on the first network device are generated during a same time period.

6. The method as in claim 5, wherein the same time period is selected by the second network device based on available network resources.

7. The method as in claim 5, wherein the second network device reverts to using model parameters from a previous time period based on a determination that performance metrics determined by the first and second network devices diverge for model parameters associated with the same time period.

8. The method as in claim 1, wherein the first network device is selected by a network manager.

9. The method as in claim 1, wherein the first network device is selected via a validation request broadcast by the second network device to a plurality of network devices.

10. An apparatus, comprising:
one or more network interfaces to communicate in a computer network as a first network device;
a processor coupled to the network interfaces and configured to execute one or more processes; and
a memory configured to store a process executable by the processor, the process when executed operable to:
receive a notification that the first network device has been selected to validate a machine learning model for a second network device, wherein the first network device and the second network device are different routers in the computer network;
receive model parameters for the machine learning model generated by the second network device using training data on the second network device;
use the model parameters with local data on the first network device to determine performance metrics for the model parameters, wherein the use of the model parameters includes using a closed-loop feedback between the second network device and the first network device to detect overfitting of the machine learning model; and
transmit the performance metrics to the second network device to compare the performance metrics at the first network device to a local performance metrics of the learning machine model at the second network device,
wherein when the performance metrics transmitted by the first network device diverge from the local performance metrics generated by the second network device, the machine learning model is deemed to be overfit.

11. The apparatus as in claim 10, wherein the machine learning model is an artificial neural network (ANN).

12. The apparatus as in claim 11, wherein the training data on the network device and the local data are generated during a same time period.

13. The apparatus as in claim 12, wherein the network device reverts to using model parameters from a previous time period based on a determination that the performance metrics for the model parameters differ from performance metrics generated by the network device.

14. The apparatus as in claim 10, wherein the training data on the second network device and the local data on the first network device are generated during a same time period.

15. A tangible, non-transitory, computer-readable media having software encoded thereon, the software, when executed by a processor on a first network device, operable to:
receive a notification that the first network device has been selected to validate a machine learning model for a network device;
receive model parameters for the machine learning model generated by the network device using training data on the network device;
using the model parameters with local data to determine performance metrics for the model parameters, wherein using the model parameters includes using a closed-loop feed-back between the second network device and the first network device to detect overfitting of the machine learning model; and
transmitting the performance metrics to the network device to compare the performance metrics at the first network device to a local performance metrics of the learning machine model at the second network device,
wherein when the performance metrics transmitted by the first network device diverge from the local performance metrics generated by the second network device, the machine learning model is deemed to be overfit.

16. A method comprising:
sending, by a first network device over a computer network, a validation request to one or more network devices to validate a machine learning model, wherein the first network device and the one or more network devices are different routers or servers in the computer network;
receiving, at the first network device, a notification that a particular network device of the one or more network devices has been selected to perform the validation;
sending, by the first network device, model parameters for the machine learning model to the particular network device to cause the particular network device to generate performance metrics using the model parameters with a local data set on the particular network device, wherein a closed-loop feed-back between the particular network device and the first network device is created to detect overfitting of the machine learning model;
receiving, at the first network device, the performance metrics for the model parameters generated by the particular network device; and
determining whether the model parameters are valid based on a comparison between the received performance metrics and performance metrics generated by the first network device,
wherein when the received performance metrics diverge from the performance metrics generated by the first network device, the machine learning model is deemed to be overfit.

17. The method as in claim 16, wherein the machine learning model is an artificial neural network (ANN).

18. The method as in claim 16, wherein the model parameters are associated with a first time period, the method comprising:
determining that the model parameters are not valid; and
reverting to model parameters from a previous time period.

19. The method as in claim 16, further comprising:
determining that the model parameters are not valid; and
generating new model parameters.

20. The method as in claim 16, further comprising:
determining a data collection time period to generate the model parameters based on network activity.

21. The method as in claim 16, wherein the validation request is a unicast message sent to a network manager.

22. The method as in claim 16, wherein the validation request is a broadcast message sent to a plurality of network devices.

23. An apparatus, comprising:
one or more network interfaces to communicate in a computer network;
a processor coupled to the network interfaces and configured to execute one or more processes; and
a memory configured to store a process executable by the processor, the process when executed operable to:

send a validation request to one or more network devices to validate a machine learning model, wherein the apparatus and the one or more network devices are different routers or servers in the computer network;
receive a notification that a particular network device has been selected to perform the validation;
send model parameters for the machine learning model to the particular network device to cause the particular network device to generate performance metrics using the model parameters with a local data set on the particular network device, wherein a closed-loop feed-back between the particular network device and the apparatus is created to detect overfitting of the machine learning model;
receive the performance metrics for the model parameters generated by the particular network device; and
determine whether the model parameters are valid based on a comparison between the received performance metrics and locally generated performance metrics for the model parameters, wherein when the received performance metrics diverge from the performance metrics generated by the apparatus, the machine learning model is deemed to be overfit.

* * * * *